United States Patent [19]

Keefer

[11] Patent Number: 4,807,990
[45] Date of Patent: Feb. 28, 1989

[54] LASER FLUORESCENCE VELOCIMETER

[75] Inventor: Dennis R. Keefer, Manchester, Tenn.

[73] Assignee: University of Tennessee Research Corporation, Knoxville, Tenn.

[21] Appl. No.: 923,873

[22] Filed: Oct. 28, 1986

[51] Int. Cl.$^4$ ............... G01P 3/36; G01B 9/02; G01T 1/20

[52] U.S. Cl. ............... 356/28.5; 250/356.1; 250/361 R; 250/362; 250/573; 356/349

[58] Field of Search ............... 356/28.5, 349; 250/356.1, 361 R, 362, 364, 573

[56] References Cited

U.S. PATENT DOCUMENTS

| | | | |
|---|---|---|---|
| 3,915,572 | 10/1975 | Orloff | 356/28.5 |
| 4,351,709 | 9/1982 | Goetz | 356/28 X |
| 4,373,807 | 2/1983 | Gouesbet | 356/28.5 |
| 4,483,614 | 11/1984 | Rogers | 356/28.5 |
| 4,506,979 | 3/1985 | Rogers | 356/28.5 |
| 4,575,238 | 3/1986 | Knühtsen et al. | 356/28.5 |

OTHER PUBLICATIONS

Stevenson et al., "A Laser Velocimeter Utilizing Laser-Induced Fluorescence," *Applied Physics Letters*, vol. 27, No. 7, Oct. 1, '75, pp. 395–396.

Greated et al., "Frequency Shift Laser Techniques for Measuring Water and Wind Velocities," *Electro-Optics/Laser International '76 UK*, Mar. 9–11, '76, pp. 153–156.

Primary Examiner—Stephen C. Buczinski
Assistant Examiner—Linda J. Wallace
Attorney, Agent, or Firm—Luedeka, Hodges & Neely

[57] ABSTRACT

A method and apparatus are disclosed for measuring a velocity component of a moving fluid. Coherent light at two different wavelengths is directed into the moving fluid to create a space-and-time modulated optical field within a sample volume and to cause a chemical component of the moving fluid to fluoresce. Measurement of temporal and/or spatial characteristics of the resulting fluorescence is employed to determine the velocity component of the moving field.

4 Claims, 4 Drawing Sheets

LASER FLUORESCENCE VELOCIMETER

This invention was made with Government support under Contract DAAG29-83-K-0110 awarded by The U.S. Army Research Office. The Government has certain rights in the invention.

The present invention relates to systems for the measurement of the velocity of a moving fluid and more particularly relates to a method and apparatus for determining the velocity of a moving fluid by measuring fluorescence in the moving fluid induced by a space-and-time modulated optical field.

Several types of laser velocimeters have been developed for the measurement of fluid velocities. Known systems include particle scattering systems using crossed laser beams referred to as laser Doppler velocimeters, and a system that measures the Doppler shift in optical frequency of the fluorescence from a moving molecule. Each of these systems has been successfully applied in a wide variety of experimental flow conditions, but there are also important flow regimes for which they are not suitable.

Successful application of the system which measures the Doppler shift of the fluorescence of a molecule requires relatively high (hypersonic) velocities and low temperatures to produce a wavelength shift of the molecular fluorescence which is significant compared to thermal Doppler broadening and pressure broadening. In addition, it requires very high resolution tunable dye laser sources to resolve the lineshape of the fluorescing molecule.

The crossed beam laser Doppler velocimeter has been applied over a much broader range of flow regimes, but this system depends on the light scattered from particles passing through the crossed laser beams. The particles may occur naturally in the fluid or they may be introduced into the flow in sufficient quantity to produce the required number of scattering events. In either case, there is an implicit assumption that the particle velocity is the same as the fluid in which it is embedded. The degree to which the particle actually follows the fluid motion depends upon the acceleration of the flow and the particle size. As the acceleration of the flow increases, the particle size must decrease in order to reasonably follow the flow, and for strongly accelerated flows (e.g., shock waves, jet expansion, and wake flows), particles which are sufficiently small are difficult to introduce into the flowfield and the scattered light is often insufficient to provide reliable measurements. Particles of practical size cannot follow the flow without significant lag. The generation of particles of appropriate size, and the introduction of these particles into particular regions of interest in the flow, often result in significant experimental complications.

Moreover, the signals produced by particle scattering systems are complicated to analyze since they consist of short bursts of modulation as the particle passes through the probe volume, and the signal processor must separate these bursts and determine their frequency. Sophisticated electronic circuits are required to detect situations when more than one particle contributes to the burst in order to eliminate the measurement of erroneous frequencies. In the laser Doppler velocimeter, the burst signal has the same wavelength as the probe beams, and scattered radiation from windows and surfaces placed in the flow often limit how close to a surface reliable measurements can be obtained. One spot and two spot systems which depend upon particle scattering suffer the same limitations.

Accordingly, a need has arisen for a method and apparatus for determining the velocity of moving fluids without the limitations of known systems. More particularly, a need has arisen for a method and apparatus that is useful for a wide range of flow velocities and conditions and which obviates the need for the presence of particles in the flow.

In accordance with the invention generally, there is provided a method and apparatus for measuring a velocity component of a moving fluid. Coherent light at two different wavelengths is directed into the moving fluid to create a space-and-time modulated optical field within a sample volume and to cause at least one chemical component of the moving fluid to fluoresce. The fluorescence induced by the modulated optical field is measured to determine flow velocity. In particular, the spatial and/or temporal characteristics of the fluorescence are measured to determine flow velocity. It is preferred to measure the phase, a spatial characteristic, to determine velocity, but visibility, a temporal characteristic, also provides velocity information.

In accordance with a more particular form of the method and apparatus invention, the fluorescent light from said sample volume is detected and produces a modulated signal corresponding to the fluorescence. At least one characteristic of the modulated signal is measured to determine the velocity component of the moving fluid.

In accordance with another more particular form of the invention, a phase reference signal corresponding to the difference in wavelength between the two wavelengths of coherent light is generated and a phase shift between the modulated signal relative to the phase reference signal is measured to determine the velocity component.

In accordance with another more particular form of the invention, a value of the modulated signal corresponding to the visibility of the fluorescence is measured to determine the velocity component.

The present invention may best be understood by reference to the following detailed description of a preferred embodiment when read in conjunction with the accompanying drawings in which.

Figure 1:
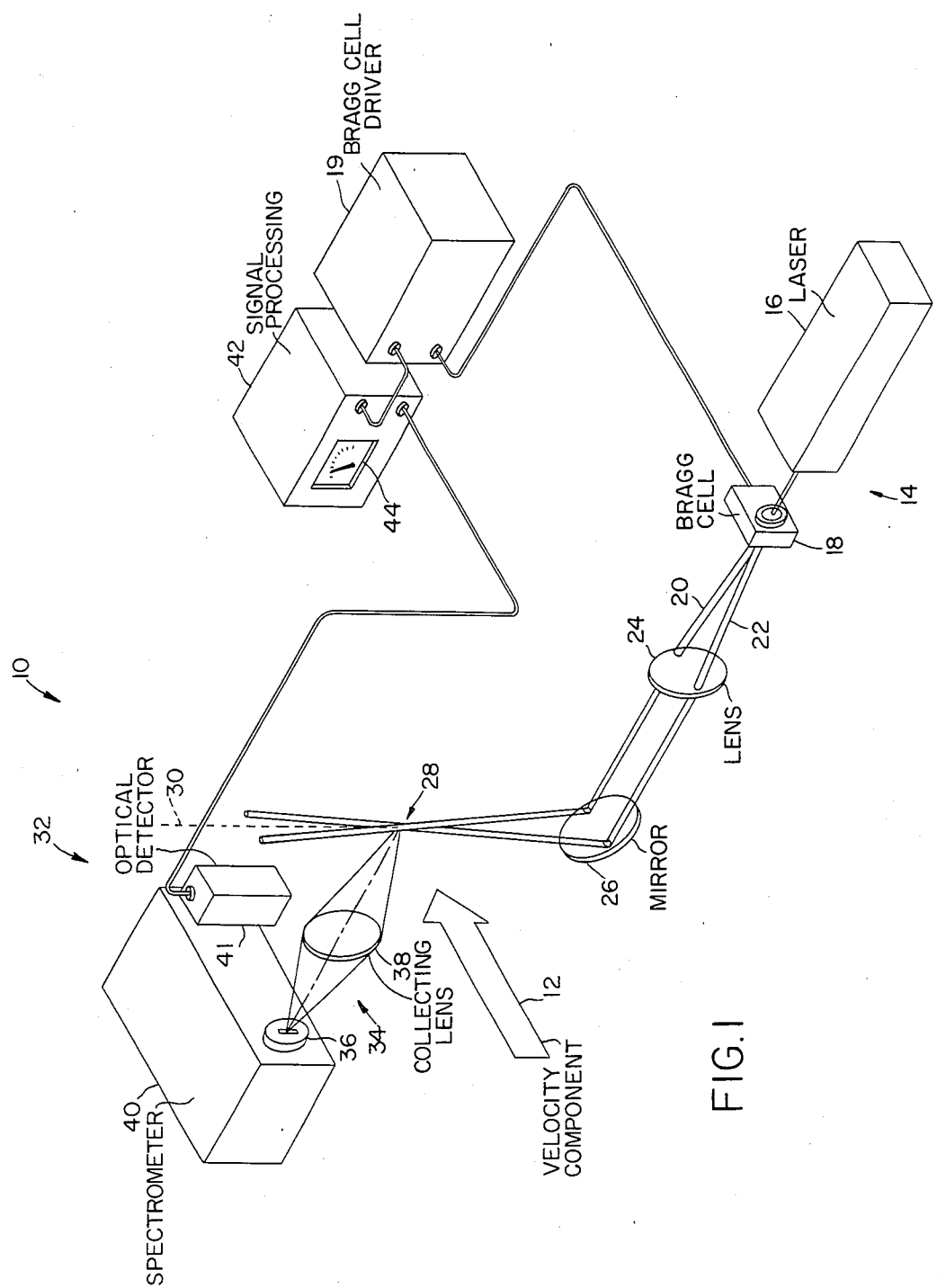
FIG. 1 is a diagrammatical view of apparatus embodying one form of the present invention.

Referring now to the drawings in which like reference characters designate like or corresponding parts, a laser fluorescence velocimeter 10 embodying one form of the present invention is illustrated in FIG. 1. The apparatus 10 depicted operates to measure the velocity of a moving fluid with the velocity component measured being indicated by arrow 12. As will become apparent hereinafter, any desired velocity component of the moving fluid can be observed and the application of the invention need not be limited to the measurement of the velocity in the overall direction of flow. As used herein, "velocity component" is used in its broadest name. Since all velocity has direction, measurement of an absolute magnitude of velocity is considered a particular velocity component. The same velocity would have other velocity components in other directions.

As illustrated in FIG. 1, the laser velocimeter 10 includes a coherent light source 14 for producing coherent light at two different wavelengths. The coherent light source 14 depicted includes a single frequency tunable dye laser 16 for producing laser light at a precise wavelength which is converted into light of two different wavelengths. Light from the laser 16 is directed into an acousto-optic modulator device referred to as a Bragg cell 18 to produce the two different wavelengths.

The Bragg cell 18 is supplied with a driving signal from a Bragg cell driver 19 which is converted into acoustic waves in a deflection medium inside the cell. The light from the laser 16 is split and one beam is not affected by the Bragg cell 18 whereas the other beam is deflected within the Bragg cell by the deflection medium moving with the modulating signal. Due to the Doppler effect, a frequency displacement of this beam results from the movement of the deflecting medium. A first beam 20 thus emerges from the Bragg cell 18 essentially unaffected by the Bragg cell and a second frequency-shifted beam 22 emerges with a small angle of divergence between the beams. The two diverging beams 20 and 22 are caused to converge and intersect at a desired region of the moving fluid by lens 24 and turning mirror 26.

As depicted, the first beam 20 and the second frequency-shifted beam 22 converge and cross in a region within which it is desired to measure fluid velocity. As will be explained in more detail hereinafter, the convergence of the two beams produces a space-and-time modulated optical field consisting of moving parallel sheets of optical intensity which vary periodically in both space and time. The region of the moving fluid in which this occurs will be referred to hereinafter as the sample volume and is designated generally by the reference character 28. As will also be explained, the first beam 20 and the second beam 22 are directed into the moving fluid such that a bisector 30 of the angle between the two beams is normal to the component of fluid velocity to be measured. Any velocity component of the fluid can be measured by adjusting the beams accordingly.

The wavelength of the coherent light produced by the coherent light source 14 is such that the space-and-time modulated optical field in the sample volume 28 causes fluorescence of at least one chemical component of the moving fluid. The fluorescing chemical component can occur naturally in the fluid. For example, nitrogen is suitable for use as the fluorescing chemical component in air. Alternately, the fluid can be seeded with a substance which will fluoresce with a chosen light source. It is preferable for the fluorescence to be at a different wavelength than the light source to facilitate detection of the fluorescence. It will be understood that the word light as referred to in this patent application is not intended to be restricted to light of the visible spectrum but also includes other wavelengths which are capable of inducing fluorescence.

The temporal and spatial characteristics of the fluorescence induced by the space-and-time modulated optical field on the fluid in the sample volume 28 are explained by the following, assuming that an infinite reservoir of fluorescing molecules are available.

In a space and time modulated probe volume created by two laser beams whose frequency differs by $vf$ and that intersect at the angle $\phi$, the optical intensity in the probe volume is given by, $$I(x,t) = I_0(x)\left[1 - \cos\left[2\pi\left(vft - \frac{x}{\lambda f}\right)\right]\right], \quad x \geq 0 \quad (1)$$
$$= 0 \quad x < 0$$

where x is the distance into the probe volume in a direction perpendicular to the fringes, $\lambda f$ is the fringe spacing and $I_0(x)$ is the envelope of intensity in the probe volume. The fringe spacing is given by, $$\lambda f = \frac{\lambda}{[2\sin(\phi/2)]} \quad (2)$$

where $\overline{\lambda}$ is the average wavelength of the laser beams. The fringes move at a velocity giveny by, $$vf = \lambda f vf \quad (3)$$

Molecules which can be excited at the wavelength $\overline{\lambda}$ are embedded in a fluid that moves with a velocity component of u in the positive x direction. For the infinite reservoir model, the equation governing the population of the excited molecules is, $$\frac{dn}{dt} = a\eta_0 I(x,t) - An \quad (4)$$

where a is the rate of excitation of the ground state molecules of (constant) density, $n_0$ and A is the total loss rate due to radiation and collision.

It will be convenient to define variables for time, distance and velocity such that, $$\tau = vft \quad (5a)$$
$$\epsilon = x/\lambda f \quad (5b)$$
$$\mu = u/vf \quad (5c)$$

The position of the fluid element at the time $\tau$ is given by, $$\epsilon = \epsilon_0 + \mu\tau \quad (6)$$

where $\epsilon_0$ is the initial location of the fluid element at $\tau$ equal to zero. Thus, the equation governing the density of excited particles becomes, $$\frac{d\eta(\epsilon_0,\tau)}{d\tau} + \frac{A}{vf}\eta(\epsilon_0,\tau) = \frac{a\eta_0}{vf}I(\epsilon_0,\tau) \quad (7)$$

The intensity experienced by this fluid element at time $\tau$ is given by $$I(\epsilon_0,\tau) = I_0\{1 - \cos[2\pi(1-\mu)\tau - 2\pi\epsilon_0]\}, \quad \tau \geq \tau_0 \quad (8)$$
$$= 0. \quad \tau < \tau_0$$

where the intensity has been assumed to be constant for $\epsilon$ greater than zero and $\tau_0$ is the time it takes the fluid element starting at $\epsilon_0$ to reach the edge of the probe volume located at $\epsilon$ equal zero, $$\tau_o = -\frac{\epsilon_o}{\mu} \quad (9)$$

Figure 2:
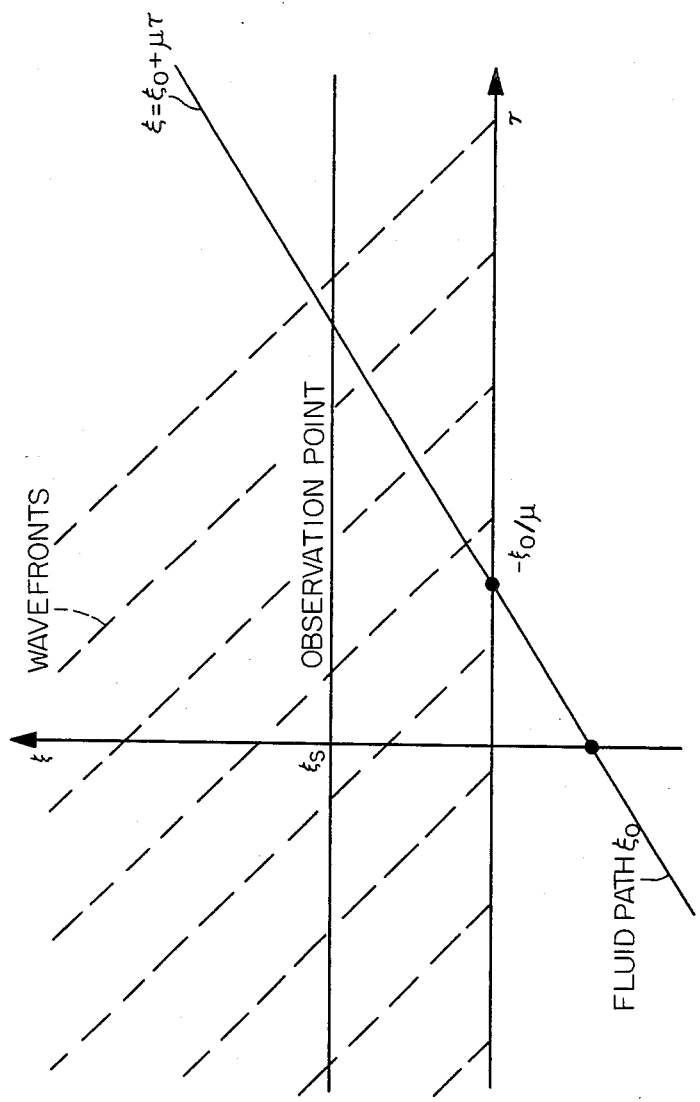
FIG. 2 is a time-distance plot of the trajectory of a fluid element and solution domain according to theoretical relationships employed in the present invention.

The trajectory of the fluid element and the solution domain are represented on a time-distance ($\tau - \epsilon$) plot shown in FIG. 2.

The initial condition for equation (7) is, $$\eta(\epsilon_0, \tau_0) = 0 \quad (10)$$

and the solution for equations 7 through 10 is given by, $$\eta(\epsilon_o, \tau) = \frac{\alpha \eta_o}{\nu_f} e^{-A/\nu_f \tau} \int_{\tau_o}^{\tau} e^{A/\nu_f \tau} I(\epsilon_o, \tau) d\tau \quad (11)$$

Evaluation of the integral yields the result, $$\eta(\epsilon_o, \tau) = \frac{\alpha \eta_o I_o}{A} \Big\{ 1 - V\cos[2\pi(1-\mu)\tau - 2\pi\epsilon_o - \phi] - e^{-\frac{A}{\nu_f}(\tau - \tau_0)} \Big[ 1 - V\cos[2\pi(1-\mu)\tau_o - 2\pi\epsilon_o - \phi]\Big] \Big\} \quad (12)$$

where the visibility is defined by, $$V = \left\{ 1 + \left[\frac{\Omega}{A}(1-\mu)\right]^2 \right\}^{-\frac{1}{2}} \quad (13)$$

and the phase is defined by, $$\phi = \tan^{-1}\left[\frac{\Omega}{A}(1-\mu)\right] \quad (14)$$

where $\Omega$ has been defined as equal to $2\pi\nu f$.

To observe the population at a particular point within the fringe system ($\epsilon > 0$) we note that the initial location of the fluid element is related to the position of observation and to the time of observation by, $$\epsilon_0 = \epsilon_0 + \mu\tau \quad (15)$$

and equation 12 can be written, $$\eta(\epsilon_o, \tau) = \frac{\alpha \eta_o I_o}{A} (1 - V\cos[2\pi(\tau - \epsilon_o) - \phi] - e^{-A\epsilon_o/\mu\nu f}\{1 - V\cos[2\pi(\tau - \epsilon_o/\mu) - \phi]\}) \quad (16)$$

The intensity within the probe volume can also be expressed in terms of the location of the observation point $\epsilon_0$ by use of equation 15 in equation 8 to give, $$I(\epsilon_0, \tau) = I_0\{1 - \cos[2\pi(\tau - \epsilon_0)]\} \quad (17)$$

Equation 16 consists of a steady-state modulation represented by the first terms, and the second term is a transient which decays exponentially over distances of the order of u/A fringes. When $\epsilon_0$ is greater than u/A, then the power radiated due to fluorescence of the excited molecules approximately is given by, $$P(\epsilon_o, \tau, \lambda) = \frac{hc}{\lambda} \frac{A_\lambda}{A} \alpha\eta_o I_o\{1 - V\cos[2\pi(\tau - \epsilon_o) - \phi]\} \quad (18)$$

where $\lambda$ is the wavelength of the fluorescence, h is Planck's constant, c is the speed of light, and $A_\lambda$ is the transition probability transition at wavelength $\lambda$.

Figure 3:
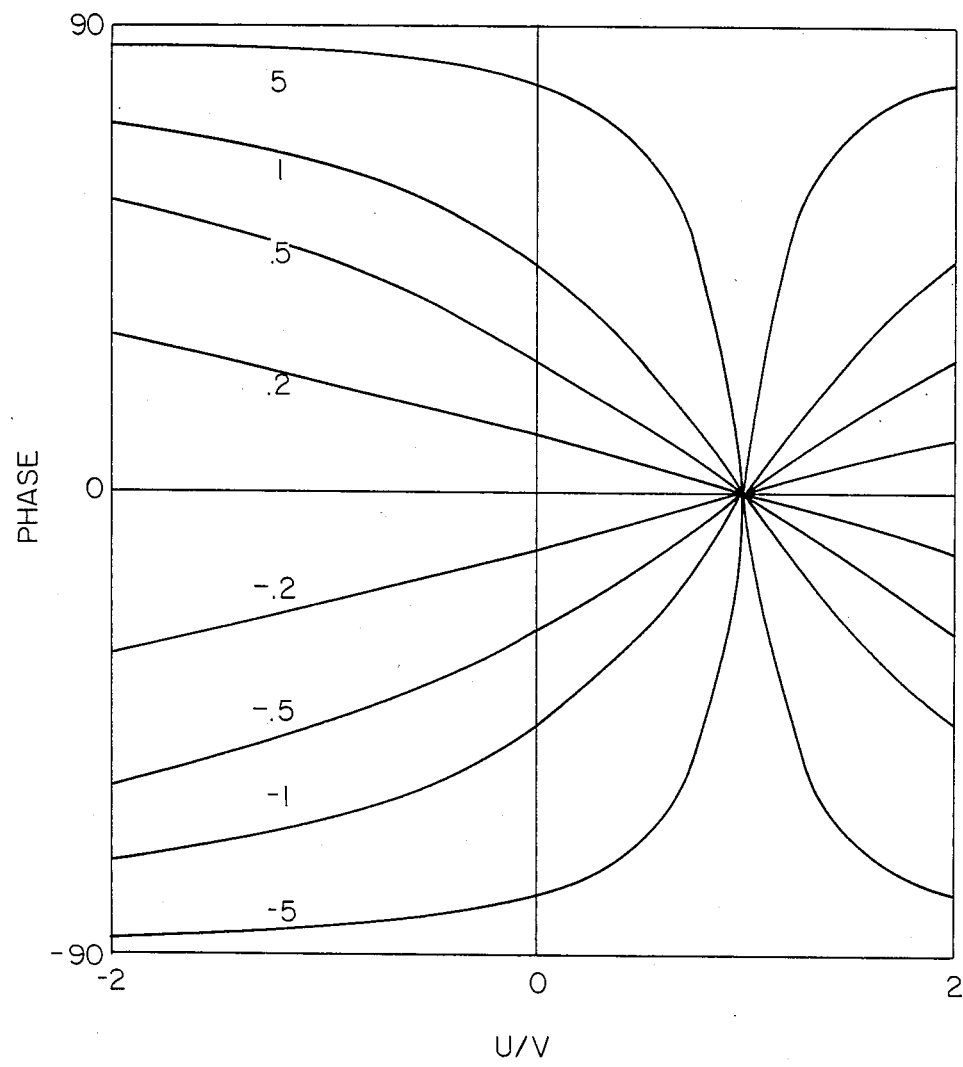
FIG. 3 is a plot of phase of a fluorescence signal as a function of flow velocity according to theoretical relationships employed in the present invention.
Figure 4:
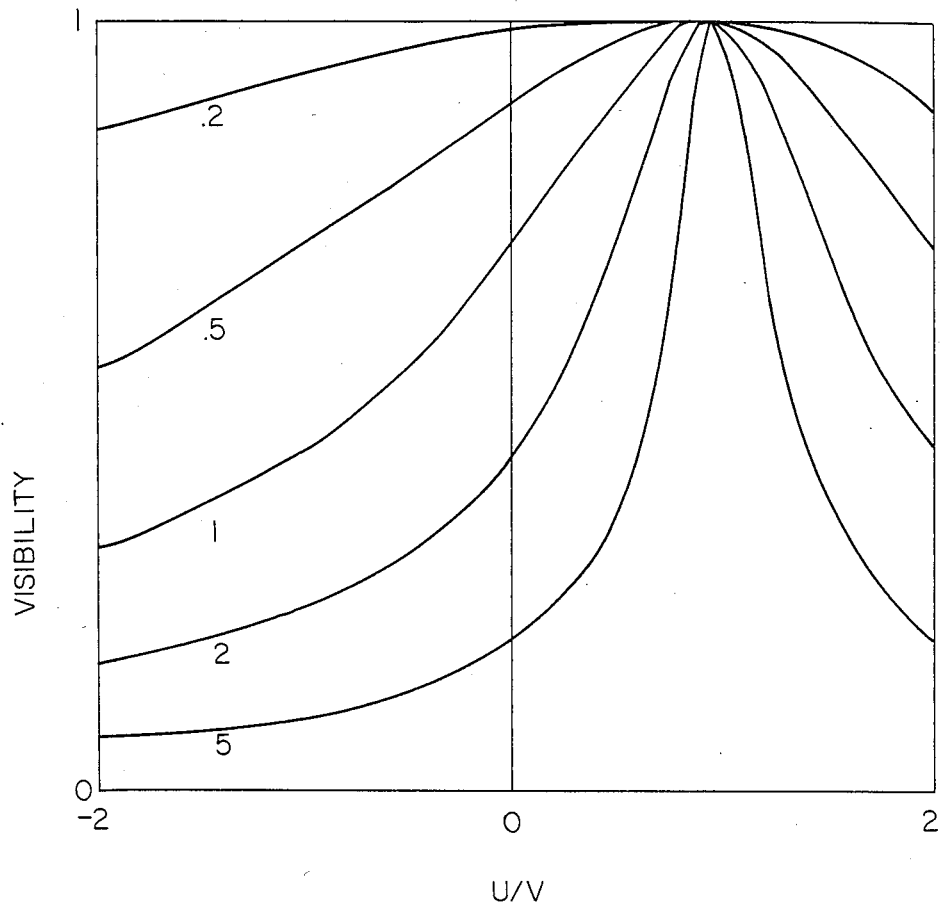
FIG. 4 is a plot of visibility of the fluorescence signal as a function of flow velocity according to theoretical relationships employed in the present invention.

Examination of these equations reveals that the fluorescence radiation, measured at a fixed location within the fringe system, has the frequency $\nu f$ which is the same as the difference in frequency of the two beams creating the modulated optical field, but the visibility and the phase are dependent on the velocity of the fluid flow through equations 13 and 14. The phase and visibility both depend on the value of a single parameter, $$\beta = \frac{\Omega}{A}(1 - \mu) \quad (19)$$

consisting of two factors. The first factor is the ratio of the modulation frequency to the total depopulation rate of the excited state, and the second factor contains the velocity dependence. FIGS. 3 and 4 graphically illustrate these relationships for phase and visibility, respectively.

In accordance with the relationships described above, the apparatus 10 further includes a fluorescence detection and measurement system 32 for detecting and measuring the fluorescence to determine fluid velocity. Temporal and spatial characteristics of the fluorescence induced by the space-and-time modulated optical field in the sample volume 28 are utilized to determine flow velocity. In the preferred embodiment illustrated, the phase shift of the fluorescent light is measured since it is dependent on the fluid velocity as explained above. Visibility, which is essentially the depth of modulation of the signal, can also be measured to determine velocity but it will be affected by unmodulated fluorescence emitted from regions of laser beams outside of the sample volume and also by the modulation transfer function of the collecting optics. It will be understood, however, that for some applications visibility is a useful parameter.

The detection and measurement system 32 in the apparatus 10 includes an optical arrangement 34 for receiving fluorescent light from the sample volume 28 and directing it into the system 32. The optical arrangement 34 includes a collecting lens 38 which has an optical axis placed normal to the plane containing the beams 20 and 22 which intersect to form the sample volume 28. The optical arrangement 34 also includes an entrance slit 36 having a slit axis parallel to the bisector 30 of the two beams. Fluorescent light passing through the slit enters a spectrometer 40 which separates the light from the sample region according to wavelength and only transmits light corresponding to the wavelength of the fluorescence and eliminates any light scattered from the two laser beams in the sample region 28. In the preferred embodiment, a tunable grating monochromater is employed as the spectrometer 40. Light transmitted by the spectrometer 40 passes into an optical detector 41, preferably a photomultiplier, which produces a modulated electrical signal corresponding to the intensity of the fluorescent light received.

The detection and measuring system 32 further includes a signal processing system 42 which receives the modulated electrical signal from the optical detector 41 and which receives a reference signal from the Bragg cell driver 19 which corresponds to the driving signal supplied to the Bragg cell 18. The signal processing system 42 compares the modulated electrical signal to the reference signal to determine a phase shift. The signal processing system converts the phase shift to a signal representing the magnitude of the velocity component of the moving fluid which is supplied to visual readout 44. It will be understood that for some applications, instead of a visual readout, a data acquisition device be employed to record the observed phase shift over a period of time so that such data can subsequently undergo more detailed analysis. Phase lock detection of the electrical signal corresponding to the fluorescence is referenced to the signal from the Bragg cell driver 19 and integration of the signal over many periods provides an accurate measurement of phase shift. The magnitude of this phase shift provides direction information as to a particular velocity component. That is, the apparatus measures a particular velocity component which includes two opposite directions. Molecules moving to the left along the axis of the velocity component will produce a phase shift magnitude different than molecules moving to the right, and, thus, the phase shift includes information as to the direction of the velocity component of the molecules.

In operation of the preferred embodiment depicted, coherent light at two different wavelengths in beams 20 and 22 are directed by the coherent light source 14 into the sample volume 28 with the bisector 30 of the beams being normal to the velocity component of the fluid to be measured. The space-and-time modulated field produced causes the selected chemical component in the fluid to fluoresce. The optical arrangement 38 of the detection and measurement system 32 directs the resulting fluorescent light through entrance slit 36 and into the spectrometer 40 which transmits light corresponding to the wavelength of the fluorescence to the optical detector 41 to produce a modulated electrical signal. The signal processing system receives the modulated electrical signal and compares it to the reference signal from the Bragg cell driver 19 to produce a signal which is supplied to the visual readout 44 which displays a reading for the velocity component.

In an alternate embodiment, the velocimeter 10 uses a Bragg cell 18 that is operable to shift the frequency of either of beams 20 and 22. In this embodiment, the cell 18 operates in a first mode by shifting the frequency of beam 20 and leaving beam 22 at the original frequency of laser 16. Then, the cell 18 operates in a second mode by shifting the frequency of beam 22 and leaving beam 20 at the original frequency. The modulated optical field at the sample volume 28 that is created by the first mode of operation moves in an opposite direction from the optical field that is created by the second mode of operation. Thus, the two modes of operation will produce different phase shifts in the fluorescent light detected by the spectrometer 40, and the velocity of the fluid may be determined by comparing the phase of the fluorescent light created by the two different modes of operation. The advantage of this embodiment is that the fluorescent light generated at the sample volume provides its own phase reference signal, but a disadvantage is that the left/right direction of the fluid velocity component is not determined by this embodiment.

The method and apparatus of the present invention has a number of advantages when compared to the conventional, particle-based laser Doppler velocimeter. An important advantage is the elimination of the requirement that the flow contain particles and the invention is well suited for continuously flowing fluids and complex situations such as shock waves, jet expansion, and wake flows. Instead of particles, only the appropriate atomic or molecular species for producing the fluorescence need be present in the flow. In most flows of practical interest, a chemical species can be selected which follows the flow within which it is embedded. The invention is most advantageously employed when the chosen species produces strong fluorescing lines at a wavelength different from the absorbing line. Using the tunable dye lasers which are presently available, there are numerous candidates for the fluorescing species—both as naturally occurring flow constituents or as added seed material.

The signal produced consists of a continuous signal of constant frequency. Compared with a laser Doppler velocimeter which produces burst signals, a continuous signal has a number of advantages. First, since the signal is of fixed frequency, a higher degree of electronic discrimination is possible using phase lock detection. This has the advantage of discriminating between fluorescence signals which arise from the probe volume and fluorescence which arises from other regions along the laser beams. Secondly, since the signal is continuous, it is possible to integrate over a number of periods of the signal in order to improve the precision of the electronic measurement. In addition, use in the preferred embodiment of a fluorescent signal at a wavelength different from that used to excite the fluorescing component of the moving fluid, makes it possible to use wavelength discrimination to reduce problems which arise due to scattering from optical surfaces or from naturally occurring particles within the probe volume. Furthermore, the single frequency tunable dye laser makes it possible to scan the exciting wavelength to obtain a measurement of the linewidth of the absorbing species within the probe volume.

While a preferred embodiment of the invention has been shown and described in the foregoing detailed description, there is no intent to limit the invention to this embodiment and it will be understood that the invention is capable of numerous modifications without departing from the spirit of the invention as set forth in the appended claims.

What is claimed:

1. A method for measuring a velocity and direction component of a moving fluid having a chemical component that will fluoresce comprising:

directing two coherent light beams of two different wavelengths to intersect in the moving fluid to create a space-and-time modulated optical field in the form of a changing interference pattern within a sample volume, said wavelengths being such that at least one chemical component of the moving fluid is caused to fluoresce and emit fluorescent light by the optical field, said directing further comprising:

providing a source of coherent light at an original frequency;

directing first and second beams of the coherent light to cross in the sample volume;

firstly shifting the optical frequency of the first beam while leaving the second beam at the original frequency; and after said first shifting, secondly shifting the optical frequency of the second beam and shifting the first beam back to the original frequency; and measuring said fluorescent light that is produced by the space-and-time modulated optical field to determine the velocity of the moving fluid.

2. The method of claim 1 wherein said measuring step comprises:

detecting and recording the fluorescent light that is produced during said first shifting, detecting the fluorescent light that is produced during said second shifting; and measuring the phase shift between the fluorescent light created during the first shifting and the fluorescent light created during the second shifting.

3. An apparatus for measuring a velocity and direction component of a moving fluid comprising:

means for producing coherent light at two different wavelengths and directing said light into the moving fluid to intersect and create a space-and-time modulated optical field in the form of a changing interference pattern within a sample volume, said wavelengths being such that at least one chemical component of the moving fluid is caused to fluoresce in the modulated optical field and emit fluorescent light, said means comprising:

means for producing coherent light at an original frequency and directing first and second beams of the coherent light to cross in the sample volume; and means for first shifting the optical frequency of the first beam while leaving the second beam at the original frequency and then secondly shifting the optical frequency of the second beam and shifting the first beam back to the original frequency; and measuring means for measuring the fluorescent light produced by the chemical component in the optical field to produce a measurement and for determining the velocity and direction component of the moving fluid from the measurement.

4. The apparatus of claim 3 further comprising an optical detecting and processing system for measuring the phase shift between fluorescent light created during the first shifting and fluorescent light created during the second shifting.

* * * * *